United States Patent Office.

JOHN J. ENSLEY, OF NEW YORK, N. Y., ASSIGNOR TO THOMAS D. LEDYARD, OF TORONTO, CANADA.

Letters Patent No. 74,063, dated February 4, 1868; antedated January 27, 1868.

IMPROVEMENT IN THE MANUFACTURE OF ILLUMINATING-GAS.

The Schedule referred to in these Letters Patent and making part of the same.

TO ALL WHOM IT MAY CONCERN:

Be it known that I, JOHN J. ENSLEY, of the city, county, and State of New York, have invented an Improvement in the Manufacture of Illuminating-Gas; and I do hereby declare that the following is a full and exact description thereof.

My invention consists in making a compound gas, by mixing, with common coal-gas, other gas made from either or both vegetable or animal substances, for the purposes hereinafter specified.

To put my invention in practice, I make common coal-gas in the usual way, and by ordinary means. I also make separately, either by apparatus for making coal-gas, or preferably by apparatus such as described in Letters Patent granted to me on the 8th day of August, 1866, a gas from any convenient vegetable substance or substances, such as wood, shavings, saw-dust, &c., and mix the gas with the coal-gas in any convenient proportions, according to convenience, or the relative abundance or cheapness of the two gases; or, I make a gas from any animal substance or substances, such as bones, offal, &c., by apparatus, as above described, for making vegetable gas, or otherwise, and mix with the coal-gas, in convenient proportions, say, of one part of the gas from animal substance to three parts of coal-gas, or otherwise; or, I mix the gases made both from vegetable and animal substances with the coal-gas, in convenient proportions, no exact proportion of either being essential.

The object of this mixture of gases is threefold: first, by the mixture of different gases in this way, especially by the admixture of gas from animal substances with coal-gas, I am more sure to produce good illuminating-gas, by furnishing proper proportions of carbon and hydrogen; second, in the separate manufacture of gases made from vegetable and animal substances, I produce and utilize other products of the distillation, such as charcoal and bone-black; and, third, in many instances, by having an abundance of vegetable or animal substances, or both, at hand, and not otherwise of value, I can make use of them, and thereby cheapen the manufacture of gas for illumination.

What I claim as my invention, and desire to secure by Letters Patent, is—

Making a compound gas, by the mixture, with common coal-gas, of gas made from bones, or other animal matter, and from wood, or equivalent vegetable matter, either separately or combined, for the purposes herein specified.

The above specification of my improvement in the manufacture of illuminating-gas signed by me, this 25th day of March, 1867.

J. J. ENSLEY.

Witnesses:
FRANK HUGHSON,
W. HILL NASH.